(12) United States Patent
Sliney

(10) Patent No.: US 11,536,580 B2
(45) Date of Patent: Dec. 27, 2022

(54) SYSTEM AND METHOD FOR PROVIDING A TRAVEL ROUTE

(71) Applicant: Ian Sliney, Falls Church, VA (US)

(72) Inventor: Ian Sliney, Falls Church, VA (US)

(*) Notice: Subject to any disclaimer, the term of this patent is extended or adjusted under 35 U.S.C. 154(b) by 313 days.

(21) Appl. No.: 16/534,289

(22) Filed: Aug. 7, 2019

(65) Prior Publication Data

US 2020/0064147 A1 Feb. 27, 2020

Related U.S. Application Data

(60) Provisional application No. 62/720,206, filed on Aug. 21, 2018.

(51) Int. Cl.
*G01C 21/34* (2006.01)
(52) U.S. Cl.
CPC ..... *G01C 21/3484* (2013.01); *G01C 21/3461* (2013.01); *G01C 21/3492* (2013.01)
(58) Field of Classification Search
CPC ............ G01C 21/3484; G01C 21/3461; G01C 21/3492; B60W 40/072; G01B 9/02096
See application file for complete search history.

(56) References Cited

U.S. PATENT DOCUMENTS

| | | | |
|---|---|---|---|
| 5,629,855 A * | 5/1997 | Kyrtsos | G05D 1/0272 342/450 |
| 10,345,106 B1 * | 7/2019 | Wilson | G01C 23/00 |
| 2012/0059720 A1 * | 3/2012 | Musabji | G01C 21/3647 701/527 |

* cited by examiner

*Primary Examiner* — Ig T An
*Assistant Examiner* — Stephanie T Su
(74) *Attorney, Agent, or Firm* — Daniel M. Cohn; Howard M. Cohn

(57) ABSTRACT

A processor-implemented method includes storing, for each of multiple road sections, section-specific road-nonlinearity values relating to road-nonlinearity characteristics of the respective road section. The method includes receiving, from a user, user-desired route-specific road-nonlinearity values relating to the road-nonlinearity characteristics. The method further includes calculating, from the stored section-specific road-nonlinearity values, for a candidate route, one or one route-specific road-nonlinearity values relating to the road-nonlinearity characteristics. The candidate route's route-specific road-nonlinearity values are compared to the user-desired route-specific road-nonlinearity values. Based on results of the comparison, the candidate route is select to be a recommended route. The recommended route is communicated to the user.

19 Claims, 5 Drawing Sheets

| | | | |
|---|---|---|---|
| CURV. ACUITY | - | START: | my current location |
| TWISTINESS | 5 | END: | 500 Main St, Oakville |
| GRADIENT | - | TWISTINESS EXHIL'N | 5 |
| HILLINESS | 2 | HILLINESS EXHIL'N | 5 |
| SHADINESS | - | LENGTH (in miles) | 5 |
| BUMPINESS | 3 | SPEED (in mph) | 5 |

11

21  22  20

SYSTEM AND METHOD FOR PROVIDING A TRAVEL ROUTE

CROSS REFERENCE TO RELATED APPLICATIONS

This application claims the benefit of U.S. Provisional Patent Application No. 62/720,206 filed on Aug. 21, 2018, which is incorporated in its entirety by reference herein.

TECHNICAL FIELD OF THE INVENTION

This relates to systems and methods for providing a recommended travel route based on user selections.

BACKGROUND OF THE INVENTION

Route-determining systems are used to determine a route for traveling from an initial geographic location to a final geographic location. An example of a route-determining system is a mobile GPS device that performs calculations required to determine a recommended route and communicates the recommended route to a user. Another example of a travel-route system is the combination of a server and mobile phone (smartphone) that intercommunicate, in which the server performs the calculations required to determine the route. The determined route is designed to minimize travel time or travel distance. The mobile device (GPS device or smartphone) inputs user selections and provides the user with visual and voice instructions to assist in navigating the route.

SUMMARY OF THE INVENTION

A processor-implemented method includes storing, for each of multiple road sections, section-specific road-nonlinearity values relating to road-nonlinearity characteristics of the respective road section. The method includes receiving, from a user, user-desired route-specific road-nonlinearity values relating to the road-nonlinearity characteristics. The method further includes calculating, from the stored section-specific road-nonlinearity values, for a candidate route, one or more route-specific road-nonlinearity values relating to the road-nonlinearity characteristics. The candidate route's route-specific road-nonlinearity values are compared to the user-desired route-specific road-nonlinearity values. Based on results of the comparison, the candidate route is selected to be a recommended route. The recommended route is communicated to the user.

Each road section might be a road-segment that contains multiple road-increments, and the section-specific road-nonlinearity values might be segment-specific road-nonlinearity values. And the method might further include—before the storing of the section-specific road-nonlinearity values—performing the following for each of the road-nonlinearity characteristics for each of the road-segments: For each of the respective road-segment's road-increments, store an increment-specific value relating to the respective road-nonlinearity characteristic. And calculate a segment-specific value for the respective road-nonlinearity characteristic for the respective road-segment based on a summation of the stored increment-specific road-nonlinearity values of the road-increments that is in the respective road-segment.

Each road-increment might have a length less than 20 feet. Each road-segment might have a length of greater than 1/10 mile.

The candidate route might be one of multiple candidate routes that extend from a user-desired starting point to a user-desired ending point. And the method might include calculating, for each candidate route, from the stored section-specific road-nonlinearity values, route-specific road-nonlinearity values. And then calculating, for each candidate route, an overall deviation of the respective candidate route's route-specific road-nonlinearity values from the corresponding user-desired route-specific road-nonlinearity values. And then selecting one of the candidate routes to be the candidate route based on the selected route's overall deviation.

The method might further comprise, prior to the selecting of the candidate route: displaying, to the user, (1) a roadmap in which a plurality of the multiple road segments are highlighted and (2) an indication that the highlighted road segments would provide relatively high travel-exhilaration if traveled; and then receiving, from the user, a user-selection of road segments, from among the highlighted road segments, that the user desires to travel. The selecting of the candidate route to be the recommended route might then be based both (1) on the results of the comparison and (2) on the candidate route including the user-selected highlighted road segments.

The calculating of the route-specific road-nonlinearity values might include performing the following for each road-nonlinearity characteristic for each candidate route: Calculating a route-specific value for the respective road-nonlinearity characteristic for the respective candidate route based on a summation of the stored section-specific road-nonlinearity values of the road-sections that are in the respective candidate route.

The method might include—after the communicating of the recommended route to the user—providing navigational guidance to the user for following the recommended route.

The road-nonlinearity characteristics might include horizontal curvature acuity, which relates to the angle of the angular orientation (A) of a steering wheel when driving along a road, relative to the steering wheel's base orientation for driving straight forward. The road-nonlinearity characteristics might include twistiness, which is associated with the magnitude of variation of the steering angle A. The road-nonlinearity characteristics might include vertical gradient. The road-nonlinearity characteristics might include hilliness, associated with vertical waviness of the route. The road-nonlinearity characteristics might include road bumpiness. The road-nonlinearity characteristics might include twistiness exhilaration, which is a positive function of both (1) number of horizontal-component inflection points of a road section and (2) summation of increment-specific horizontal-component G-forces in the road section. The road-nonlinearity characteristics might include hilliness exhilaration, which is positive function of both (1) number of vertical-component inflection points of a road section and (2) summation of increment-specific vertical-component G-forces in the road section. The selecting of the candidate route to be a recommended route might be further based on shadiness of the candidate route.

The receiving of the user-desired values might be performed by a mobile communication device that accompanies the user while the user is travelling along the recommended route. And the calculating, the comparing and the selecting might be performed by a server that is in communication with the mobile communication device.

The selecting of the candidate route to be the recommended route might include maximizing road-nonlinearity, or might include minimizing road-nonlinearity.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader and should not in any way be interpreted as limiting.

FIG. 2 is a user interface into which the user can enter user-desired values of characteristics that the recommended route should include, in accordance with the present invention.

FIG. 3 is a user interface that enables a user to select, on a displayed roadmap, locations of a starting point and ending point for the recommended route, in accordance with the present invention.

FIG. 4 is a user interface that enables the user to select, on the displayed roadmap, a road section that should be included in the recommended route, in accordance with the present invention.

FIG. 5 is a user interface that shows the recommended travel route highlighted on the displayed roadmap, in accordance with the present invention.

FIG. 6 is a user interface that shows a roadmap onto which the user has selected the starting and ending points to be the same and has selected two road-sections for the recommended route to include, in accordance with the present invention.

FIG. 7 is a user interface that shows, on the displayed roadmap, a recommended route that includes the user-selected road sections of FIG. 6, in accordance with the present invention.

DETAILED DESCRIPTION OF THE PREFERRED EMBODIMENTS

Figure 1:
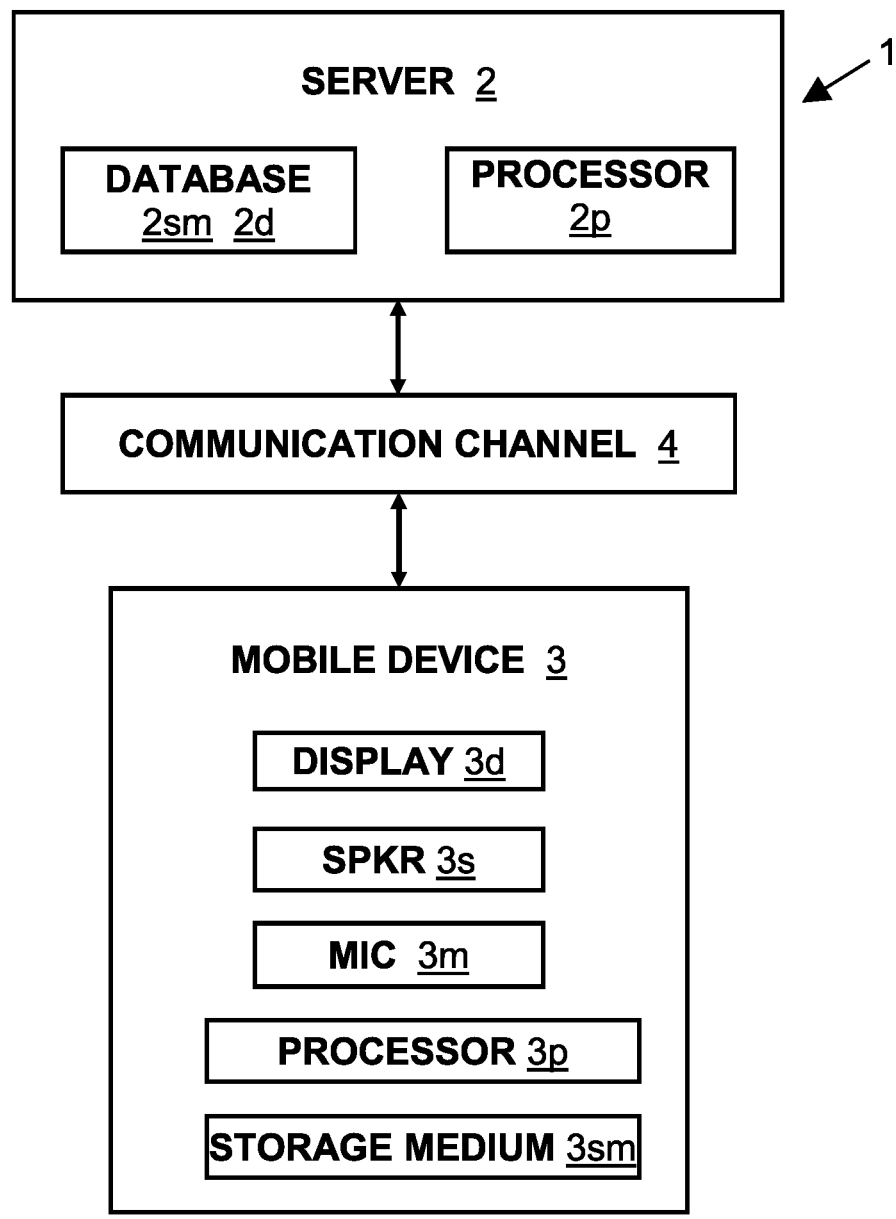
FIG. 1 is a block diagram of an example system that is configured to recommend a travel route, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Overview

FIG. 1 is a block diagram of an example system 1 that is configured to provide a recommended travel route to a user (traveler). The example system 1 includes a server 2 and at least one mobile communication device 3 (mobile device), that communicate with each other through a communication channel 4. The user enters, through the mobile device 3, road-related characteristics that the user desires the route to have. The server 2 calculates a recommended route that most-closely matches the road-related characteristics that the user entered. The recommended route is communicated from the server 2 to the mobile device 3 for display to the user. In this example, the road-related characteristics, upon which the recommended route is based, include characteristics relating to road-nonlinearity of the route.

System

Herein, the term "region" might comprise an entire country or a portion of a country or a group of countries.

Herein, a "route" comprises multiple road "segments", and a road "segment" comprises multiple road "increments".

Herein, a road "segment" might be called a "stretch-of-road". Each road-segment in urban areas might typically have a length, for example, greater than 1/10 mile and less than 1 mile. A typical road-segment in non-urban areas (e.g., highways) might have a length, for example, greater than 1 mile and less than 30 miles. A typical road-segment might comprise a block-long segment of road extending from one intersegment (21 in FIG. 3) on a road to the next intersegment on the road (22 in FIG. 3). A road-segment might extend from one node to the next node, might be represented by a road intersection.

Herein, each road-increment might typically have a length, for example, greater than 1 foot and less than 20 feet.

Herein, the term "section" is meant to mean either a road-increment or a road-segment or another length of road. Therefore, the term "section" might be replaced by the term "increment-or-segment" or by the term "increment/segment".

Herein, a road-related characteristic value that applies to a particular road-increment is called an "increment-specific" value. Similarly, a road-related value that applies to a particular road-segment is called a "segment-specific" value. And a road-related value that applies to an entire route is called a "route-specific" value.

The server 2 includes at least one (one or more) hardware processor 2p. The processor 2p executes program instructions of software code for performing steps of a process (described below) for providing a recommended travel route. The processor 2p communicates with a data storage medium 2sm.

The data storage medium 2sm is a processor-readable non-transitory hardware data-storage medium. The data-storage medium 2sm contains (stores) a database 2d of road-related data for each of multiple road-segments and/or multiple road-increments. The data storage medium 2sm might also store the software code that is executed by the processor 2p.

The road-related data in the database 2d might include, for each road segment/increment (i.e., segment and/or increment) in a region, three-dimensional geographic data comprising latitude, longitude and altitude of that respective segment/increment of road. The road-related data might further include, for each segment/increment, values for road-condition (road-surface condition), such as road bumpiness and road camber and road surface cover (e.g., whether the road is covered by grass, gravel, soil, ice, snow, water). The road-related data might further include data used to determine whether the road segment/increment is currently being shaded from the sun by shading structures (e.g., adjacent trees or buildings). The road-related data might further include data relating to whether there is currently a hazard or delay (e.g., from an accident or road-repair) on the segment/increment. The road-related data in the database 2d might have been downloaded (e.g., via Internet) from open-source road-related databases, which might be provided by governmental transportation agencies (e.g., Departments of Transportation).

Example users might include a person traveling on or in a vehicle and a person traveling on foot (e.g., running and walking).

Example vehicles are bicycles and motor vehicles. Example motor vehicles are cars, vans, trucks, recreational vehicles, and motorcycles.

Examples of the mobile device 3 include an on-vehicle device that is carried on/in (e.g., mounted on or resting in) a vehicle. Or an on-person mobile device that is manually carried by or worn by a user (e.g., smart phone, smart watch).

Examples of the mobile device 3 include a customer's mobile computing device, such as a smart phone, a GPS device, a portable computer, and an onboard computer of a vehicle (e.g., car, truck, motorcycle, bicycle).

The communication channel 4 might comprise, for example, a combination of a wired network (e.g., Internet) and a wireless (e.g., cellular) network.

The mobile device 3 in this example receives information (e.g., maps, driving instructions) from the server 2. The mobile device 3 might convey the information to the user through (1) the mobile device's touchscreen display 3d that visually displays information to the user and/or (2) the mobile device's internal speaker 3s that speaks information to the user and/or (3) a headphone (e.g., Bluetooth headphone). The mobile device 3 might receive information (e.g., data, selections, instructions) from the user through both its touchscreen display 3d and its internal microphone 3m.

The mobile device 3 further includes a hardware processor 3p that executes program instructions of software code for performing steps of the process described below.

The mobile device 3 further includes a processor-readable non-transitory hardware data-storage medium 3sm. The data-storage medium 3sm stores both (1) road-related data used in steps of the process described below and (2) the software code executed by the mobile device's processor 3p.

Process

The example system 1 might perform the following example process (method) that provides a recommended travel route to a user. The example process includes receiving, from the user, desired values for road-related characteristics. The process calculates (determines) road-related characteristics for each of multiple candidate routes that extend from a user-selected starting point to a user-selected ending point (designated "START" and "END" in FIGS. 2-7). The process then selects one of the candidate routes to be the recommended route, based on the selected route's closeness of fit with the user-entered characteristic values, relative to the other candidate routes.

A more-detailed description of this example process is as follows.

Figures 2, 3:
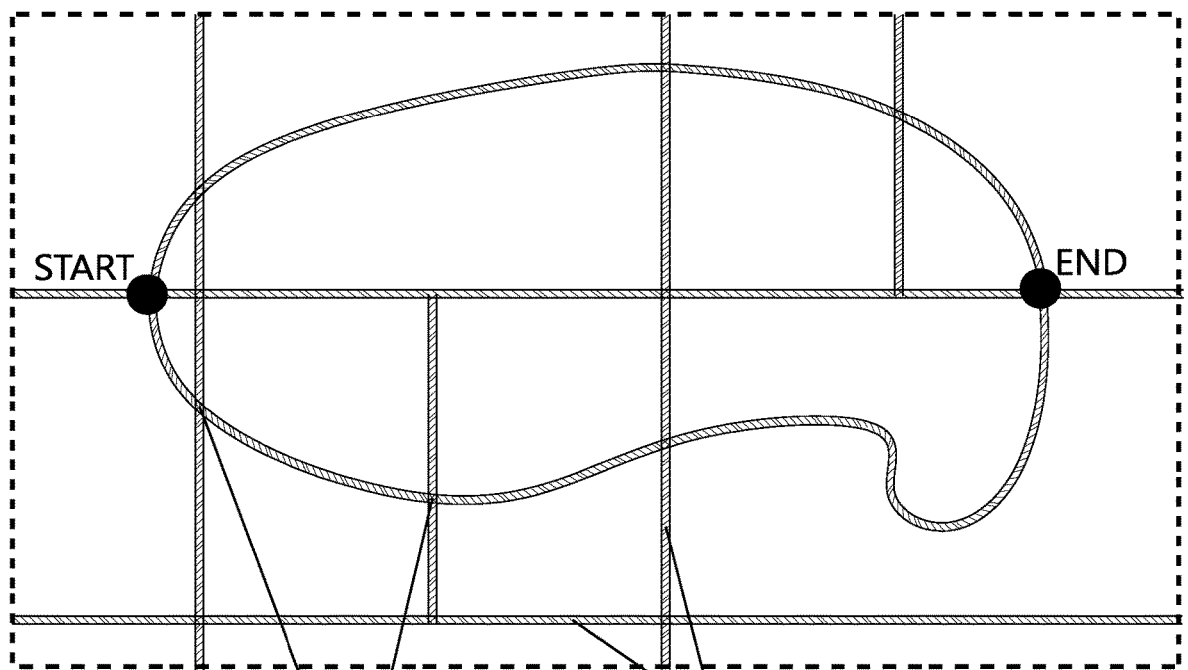
FIGS. 2-7 are example screen-shots of a user interface of the system, as follows, in accordance with the present invention.
Figure 4:
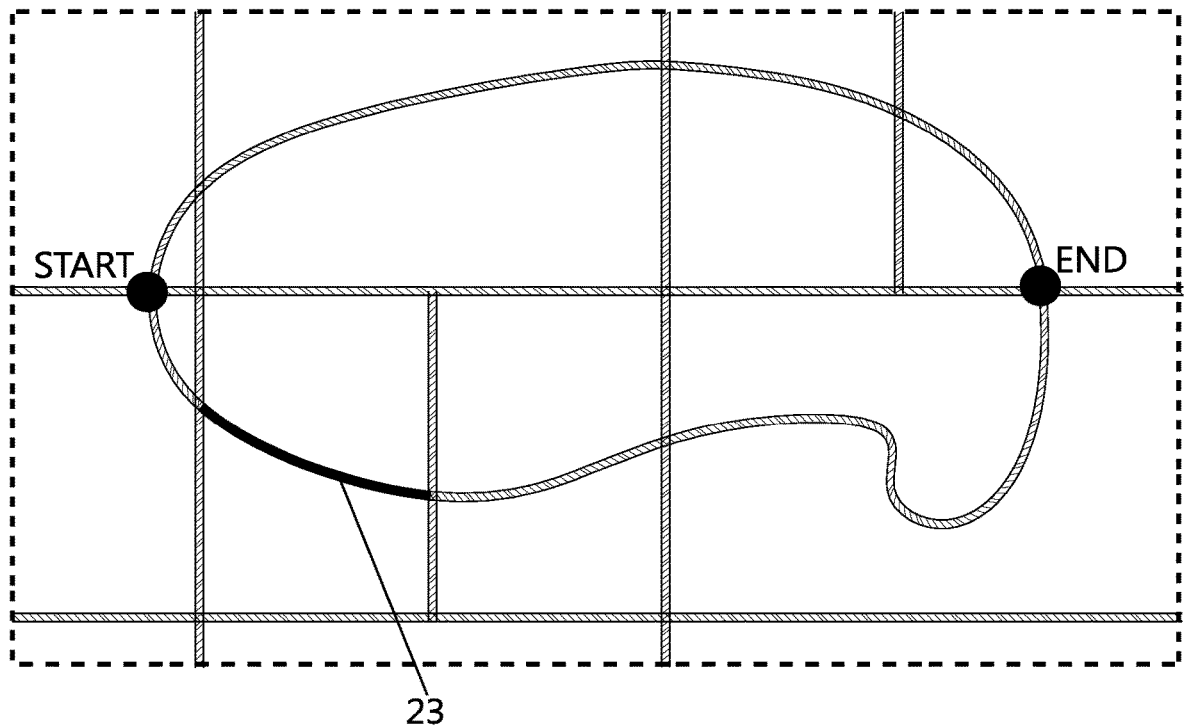

FIG. 2 is an example screen-shot of a text-entry screen of an example user interface on the mobile device's screen display 3d. The dashed periphery 11 (in each of FIGS. 2-7) represents a periphery of the screen display 3d.

The text-entry screen of the user interface prompts the user to provide (enter) user-desired values of road-related characteristics (parameters). In the example of FIG. 2, a lack of a response by the user to any query (exemplified by a dash "-" in FIG. 2), would be a user-indication that the respective characteristic is unimportant and to not take the respective characteristic into account in determining (calculating) the recommended route.

The user-provided information in this example includes a route starting point ("START" in FIG. 2) and a route ending point ("END"). The starting or ending point might be selected by the user entering, on the text-entry screen, text designating an address (e.g., by entering "500 Main St"). Or the starting or ending point might be selected by the user specifying the user's current location (e.g., by entering "my current location"). Or, as shown in FIG. 3, the user interface might display a roadmap showing a network of roads 20, and the user might click on or screen-touch locations on the roadmap to select the starting and ending points.

As shown in FIG. 2, the user interface's text-entry screen in this example prompts the user to provide desired road-related information in the form of a value for each road-related parameter, including characteristics relating to three-dimensional road-nonlinearity of the route.

One road-nonlinearity characteristic that the user is prompted to enter is horizontal curvature acuity (bend sharpness). Horizontal curvature acuity is inversely related to radius of a bend in the road. Horizontal curvature acuity is a horizontal component of a route's nonlinearity, and is perceived from a top-down view of the route, such as a roadmap. Horizontal curvature acuity might be considered to be the magnitude (i.e., absolute value) of an angle of the angular orientation (abbreviated "A") of a steering wheel (either a real or hypothetical steering wheel or some other steering device) when driving along a road, relative to the steering wheel's base (neutral) orientation (i.e., where A=0) for driving straight forward. The steering-wheel angle A (hereinafter steering angle A) might be considered as a positive value for turns to the right and a negative value for turns to the left. And horizontal curvature acuity might be the absolute value of A, abbreviated abs(A). This manner of understanding the concept of horizontal curvature acuity, in terms of the turning angle of a possibly-hypothetical steering wheel, would apply even in an example in which a person will be walking or bicycling the recommended route.

Another road-nonlinearity characteristic that the user is prompted to enter (FIG. 2) is twistiness. Twistiness is a horizontal component of a route's nonlinearity, and is perceived from a top-down view of the route, such as a roadmap. The noun "twistiness" is associated with the adjective "twisty", which might alternatively be called "bendy" and "curvy". Twistiness might be calculated as a number of horizontal inflection points along a road segment, which corresponds to the number of times the road switches from curving to the left to curving to the right, or vice versa. Twistiness might be calculated as the magnitude of variation in the steering angle A, which might be associated with the (calculus-related) derivative of steering angle A. The derivative might be expressed as abs(dA/dx), where A is steering angle, x is road position (distance traveled from the starting point), the prefix d refers to incremental change in A or x, and abs indicates absolute value (i.e., magnitude).

Another road-nonlinearity characteristic that the user is prompted to enter (FIG. 2) is gradient (steepness). Gradient relates to vertical slope B, which might be positive for an ascending incline and negative for a descending decline. Gradient (steepness) might be the absolute value of slope B, abbreviated abs(B).

Another road-nonlinearity characteristic that the user is prompted to enter (FIG. 2) is hilliness. Herein, "hilliness" is a vertical component of a route's nonlinearity, and is perceived from a side view of the route. The noun "hilliness" is associated with the adjective "hilly", which might alternatively be called "vertically-wavy". Hilliness might take, into account, the crest curve and sag curve of a hill, along with the hill's incline and decline. Hilliness might be calculated as magnitude of variation in vertical slope B, which might be associated with the derivative of B. The derivative might be expressed as abs(dB/dx), where B is vertical slope of a road section, x is route position (distance from the starting point), prefix d refers to incremental change in B or x, and abs refers to absolute value.

Another characteristic that the user is prompted to enter (FIG. 2) is twistiness exhilaration. Twistiness exhilaration relates to the level of centrifugal-force (G-force) experienced (felt) by the user due to a road's twistiness. Accordingly, twistiness exhilaration might be a positive function of both the road's twistiness and the speed that the user is expected to be traveling on that road. Twistiness exhilaration might be a positive function of both (1) a number of horizontal inflection points of a road section and (2) a summation of increment-specific horizontal G-forces of increments that comprise the road section. Twistiness exhilaration might be calculated to include the aforementioned number of horizontal inflection points times the aforementioned summation of increment-specific horizontal G-forces.

Another road-nonlinearity characteristic that the user is prompted to enter (FIG. 2) is hilliness exhilaration. Hilliness exhilaration relates to the level of centrifugal-force (G-force) experienced by the user due to a road's hilliness. Accordingly, hilliness exhilaration might be a positive function of both the road's hilliness and the speed that the user is expected to be traveling on that road. Hilliness exhilaration might be a positive function of both (1) a number of vertical inflection points of a road section and (2) a summation of increment-specific vertical G-forces of increments that comprise the road section. Hilliness exhilaration might be calculated to include the aforementioned number of vertical inflection points times the aforementioned summation of increment-specific vertical G-forces.

A calculation of total G-forces experienced on a particular road section might assume a vehicle of constant mass travelling at a constant velocity along the road section. The constant mass of the vehicle may be, for example, one ton. And the constant velocity may be, for example, 30 miles per hour. The total of the G-forces for each road section might be a direct function of the radii of each horizontal and vertical curve. This calculation might then permit each individual road section to be compared with all other road sections, to determine a relative total G-force between each road section.

The aforementioned expected speed, that might be used for calculating the exhilaration values, might be entered by the user ("SPEED" in FIG. 2). Alternatively, if the user is driving a motor vehicle, the system might assume that the expected speed is the speed limit of the road section. If the user is bicycling (cycling), the system might assume the expected speed is a typical cycling speed in the range 8-30 MPH (miles per hour). If the user is walking, the system might assume the expected speed is a typical walking speed in the range 3-4 MPH.

For each road section, the server 2 might make use of artificial intelligence algorithms to effect computations upon the universe of combined road exhilaration characteristics of each road section, and then make use of an iterative cluster analysis or other such method for data clustering to categorize the universe of all road sections into a finite number of cluster categories based upon the values of all road exhilaration characteristics of all road sections. The server might then assign each and every road section to one of these cluster categories and identify them as belonging to a particular cluster category, based upon the computation of each road section's deviation from the mean road exhilaration characteristics of each cluster category.

The user-entered values for one or both of the exhilaration characteristics (twistiness-based and/or hilliness-based) might be very large values (such as infinity) if the user wants a route that maximizes the feeling of exhilaration.

The user-entered values for the characteristics of gradient and hilliness might be very large values (such as "999" or infinity) if the user wants a route that maximizes his/her ability to coast downhill at the expense of also sometimes trudging uphill.

Conversely, the user-entered values for any of the aforementioned road characteristics might be very small (such as zero) if the user wants a route that minimizes exhilaration and power consumption and jostling. Minimizing these characteristics might be desirable if the user is cycling and wants to reduce exertion. Minimizing these parameters might further be desirable if the user is driving a motor vehicle and wants to reduce features such as (1) fuel-consumption, (2) vehicle wear, (3) tire wear, (4) risk of accident, (5) jostling of the vehicle's load (especially applicable for trucks, vans, buses and RVs), (6) visibility-obstruction over hill crests and sharp bends, (7) difficulty in extricating the vehicle if it is disabled, (8) difficulty in turning the vehicle around, (9) motion sickness, and (10) need for starting-and-stopping.

Another road-related characteristic that the user might enter is road condition. One example of a road condition characteristic is road bumpiness ("BUMPINESS" in FIG. 2) or, conversely, road smoothness. The database 2d might include a quantitative value for the level of bumpiness (or smoothness) for each increment or segment of road. Road bumpiness might be a function of whether or not the road is paved (e.g., by asphalt or concrete) and (if paved) a function of the extent of cracks and pits and road unevenness (due to one side of a crack being higher than the other side of the crack). A newly-paved road-section, which is completely smooth, might be assigned a bumpiness value of zero. Bumpiness, like hilliness, is a measure of a vertical component of road-nonlinearity. However, bumpiness is a short-distance measure of the vertical-component of road-nonlinearity, whereas hilliness is a long-distance measure of the vertical-component of road-nonlinearity. Bumpiness might be characterized by an abrupt vertical discontinuity in the road surface, whereas hilliness might be characterized by a gradual variation in slope. For example, an ascent and descent over a bump might extend across an inch or less, whereas an ascent and descent over a hill might cover 200 feet or more. The user-interface on the mobile device 3 might query the user for a maximum bumpiness level or simply query whether bumpiness should be minimized.

Another example of a road-related characteristic that the user might enter is road shadiness ("SHADINESS" in FIG. 2). A shadiness characteristic (parameter) might depend on whether the road is bordered by shading structures such as buildings and trees. The shadiness characteristic might be a function of the amount of foliage provided by trees alongside the road and fall coloration. The shadiness characteristic might take into account whether there are shading structures (trees or buildings) along the road and whether, at the time of day when the user is travelling, sunlight is angled appropriately for the structures to shade the road from the sunlight. The shadiness characteristic might also take into account whether the current season of the year is appropriate for trees to bear foliage. To enable the server 2 to make shade-related determinations, the database 2d might store shade-related data. For example, the database 2d might store, for each road segment/increment in a geographic region, data relating to what times of day that segment/increment is shaded by shading structures such as trees, and/or where the trees are located relative to the road. Tree locations might be gleaned from on-online (i.e., Internet) satellite images (photos) of roads. The shadiness data might include a quantitative shadiness value for each road section, from which the server 2 can calculate—e.g., by a summation over all sections in a route—a quantitative cumulative shadiness value for the route.

Other examples of road-condition characteristics that the user might enter are the current existence and extent of gravel or ice or wetness or mud or grass on the road, and whether road camber is appropriate (suitable) for avoiding slipping off the road when the road is slippery.

The user-interface (FIG. 2) might enable the user to rank each road-characteristic based on its importance to the user. For example, the user might rearrange the characteristics in FIG. 2 (such as by dragging the displayed characteristics) to be listed in decreasing order of their importance to the user. And the user might not enter a value for any road-characteristic that is unimportant to the user.

The user-entries are uploaded by the mobile device 3 to the server 2.

The server 2 determines different candidate routes extending from the starting point to the ending point. For each candidate route, the server calculates a route-specific value for each of the road characteristics. The value for the respective route-specific characteristic, for an entire candidate route, might be calculated as a summation of all increment-specific values of that characteristic for each road-increment along the route. If each road-increment is sufficiently small, the summation would be substantially equal to a calculus integral of the respective characteristic along the entire route with respect to distance-from-starting-point ("x") along the route.

In the above example, the summation is over each road-increment along the candidate route based on the increment-specific data stored in the database 2d. In an alternative example, before ever receiving the user's request, the server 2 might calculate and prepopulate the database 2d with a segment-specific value for each of the road characteristics for each road-segment in the entire region. So that after receiving a user's request, when the server 3 needs to calculate each road characteristic for an entire candidate route, the summation it performs is not over every increment along the route, but instead only over every segment, which is a much-shorter summation since each route comprises much-fewer segments than increments. Calculating a particular segment-specific value of a particular characteristic for a particular segment might entail summing (performing a summation of) the increment-specific values of that particular characteristic over all the increments that comprise the particular segment. The summation might be converted to an average, by dividing the summation by the number of increments that comprise the segment. The average might be a simple average or a route-mean-square average.

When calculating the characteristics for the respective candidate route, the server may omit calculating a characteristic for each parameter that is user-indicated as being unimportant.

When calculating the characteristics for the respective candidate route, the process might disregard road-segments shorter than a predetermined threshold. The predetermined threshold might be, for example, $\frac{1}{10}$ km or more, or 1 km or less, or $\frac{1}{10}$ mile or more, or 1 mile or less.

For each candidate route in this example, the server calculates, for each route-specific characteristic value, a magnitude (i.e., absolute value) of deviation of that route-specific characteristic value from the corresponding user-desired characteristic value. The server then sums the deviation values together (one deviation value for each characteristic) to arrive at an overall deviation for the respective candidate route. This overall deviation is an overall measure of how much the respective candidate route's characteristics deviate from the user-desired characteristics.

The summation might be a weighted sum, in that each characteristic's deviation might be weighted based on the user's ranking of characteristics. For example, if the user has ranked twistiness as being the most important parameter, then the twistiness-deviation (i.e., the deviation of the candidate route's twistiness from the user-desired twistiness) is given the highest weighting-factor in the summation of deviations. If the user has ranked hilliness as being the second-most important parameter, then the hilliness-deviation (i.e., the deviation of the candidate route's hilliness from the user-desired hilliness) is given the second-highest weighting-factor in the summation of deviations.

The summation of deviations over all characteristics to arrive at the route's overall deviation might disregard deviations of characteristics that the user has indicated as being unimportant.

Another preference the user might enter, when requesting a recommended route, is a selection of one or more road sections that the user wants the recommended route to include. As exemplified by FIG. 4, this might be done by the mobile device 3 displaying a roadmap of the area containing the starting and ending points, and enabling the user to select (e.g., by clicking or screen-touching) one or more desired road sections (23 in FIG. 4) that the user wants the recommended route to include. The process, when determining a recommended route, might either (1) disregard any candidate route that does not include the requested road section 23 or (2) give preference to candidate routes that do include the desired road section 23.

The process selects at least one of the candidate routes to be the recommended route, based on the selected route's closeness of fit with the user-entered road-characteristic values. The closeness of fit might be based on which of the candidate routes has a lower overall-deviation than the other candidate routes. In some examples, the route selected to be the recommended route is the route whose route-specific characteristic values fit (match) the user-desired values better than any other candidate route, such as by the selected route having the lowest overall-deviation. In other examples, for various reasons, the recommended route might be a candidate route whose route-specific characteristic values fit (match) the user-desired values sufficiently well, but without actually being the absolute best fit from among all candidate routes.

Then, the server 2 communicates the resulting recommended route, over the communication channel 4, to the mobile device 3.

Figure 5:
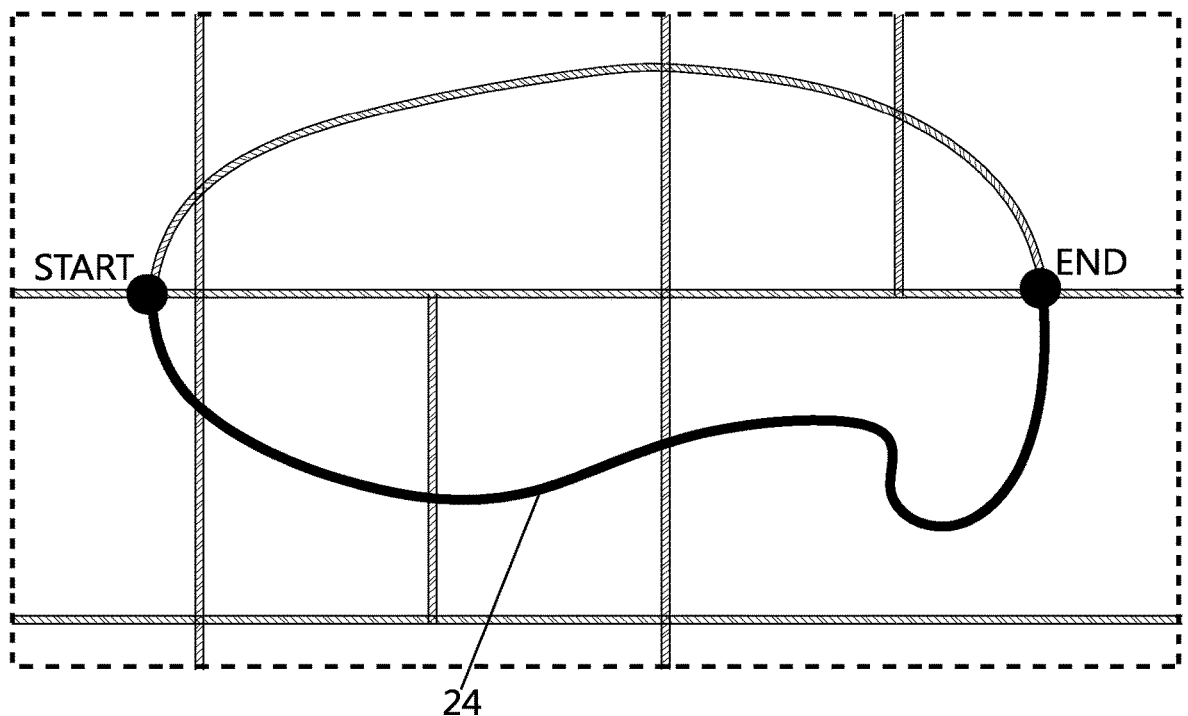
Figure 6:
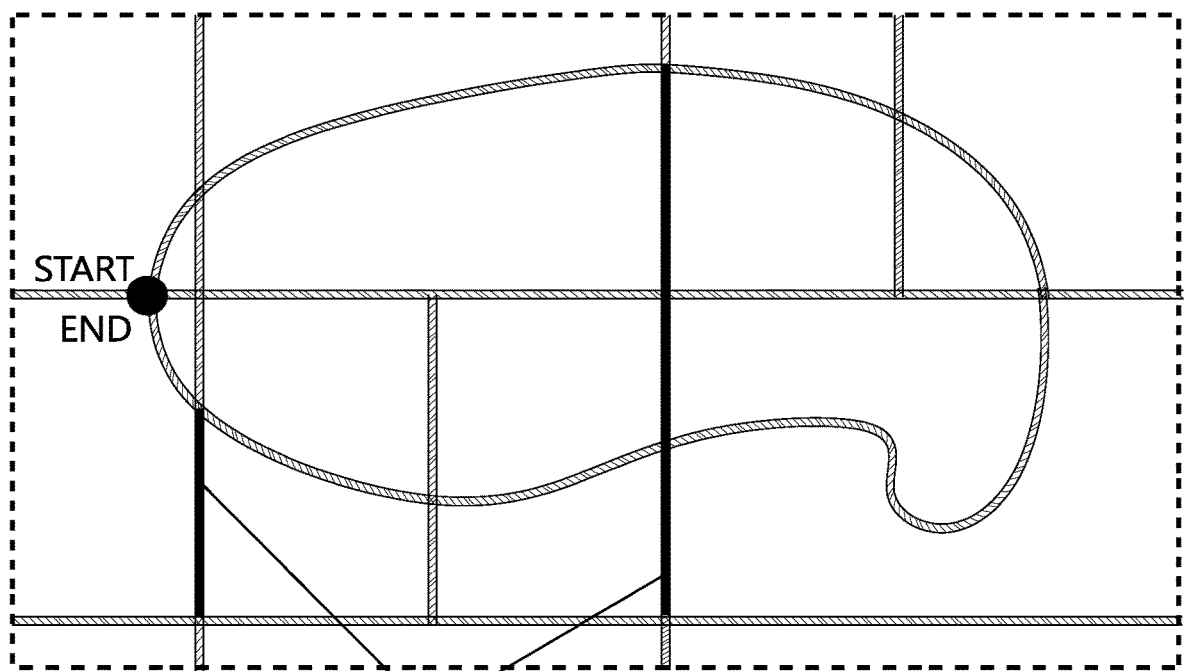
Figure 7:
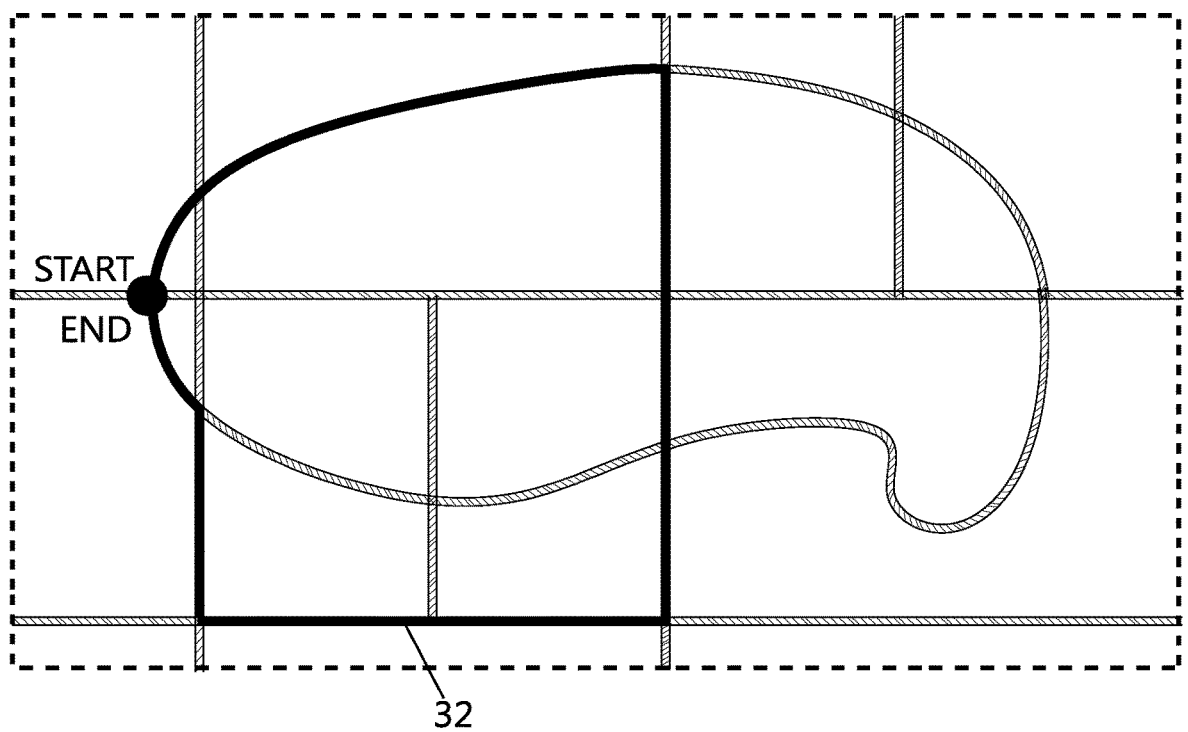

As shown in FIG. 5, the mobile device 3 displays, to the user, a roadmap in which the recommended route 24 is highlighted. While the user is traveling along the recommended route 24, the mobile device 3 provides (by display 3*d* and voice 3*m*) navigational guidance for following the recommended route 24. In the roadmap of FIG. 5, each road-segment along the recommended route 24 might be color-coded to indicate the level of one of the road-related characteristics. For example, road-segments in which slope gradient is respectively high, medium, and low might be color-coded (highlighted) respectively with dark red, medium red, and light-red. Data needed for the color-coding might be sent by the server 2 to the mobile device 3 along with the data needed for displaying the roadmap and recommended route.

The color-coding for indicating road-related characteristics might depend on the direction of travel. For example, route-segments that ascend and have an uphill gradient that is high, medium and low might be color-coded respectively by dark-red, medium-red and light-red, while route-sections that descend and have a downhill gradient that is high, medium and low might be color-coded respectively by dark-blue, medium-blue and light-blue. If the user is bicycling, this direction-based color-coding enables the user to anticipate where, and by how much, he/she will be trudging uphill and where and, by how much, he/she will be coasting downhill.

As part of the mobile device's user interface providing the navigational guidance, the user interface might warn of upcoming hazards and delays that might impede the user's exhilarating experience. Such hazards and delays might include upcoming traffic congestion and upcoming road-maintenance (as obtained for example from state highway department databases) and stoplights. The navigational guidance might include speed limits. The navigational guidance might include points of interest such as upcoming restaurants and restrooms and gas stations. The mobile device 3 might provide means for communication between drivers in groups (convoy) to share route information and share location of others in the group. The navigational guidance might be displayed in a heads-up display in a helmet visor or on (projected onto) a windshield. The navigational guidance might include voice instructions that are projected through the vehicle's stereo speaker system.

As the mobile device 3 accompanies the user along the recommended route, the mobile device 3 might be collecting three-dimensional geographic data (e.g., GPS data, satellite data) along the way. The GPS data is used to inform the user where, along the route, the user is currently located. Additionally, the mobile device 3 might be uploading the GPS data to the server 2, for the server 2 to use to fine-tune (improve accuracy and precision of) the geographic data that is in the database 2*d*. The uploaded data might enable the server 2 to make a demographic survey, for future use, of cost efficiency fuel consumption estimates and driving habits of drivers of different age and gender and income and living location. This demographic survey information might be used by insurance companies to profile driving behaviors based on demographics for determining insurance discounts.

Figure 8:
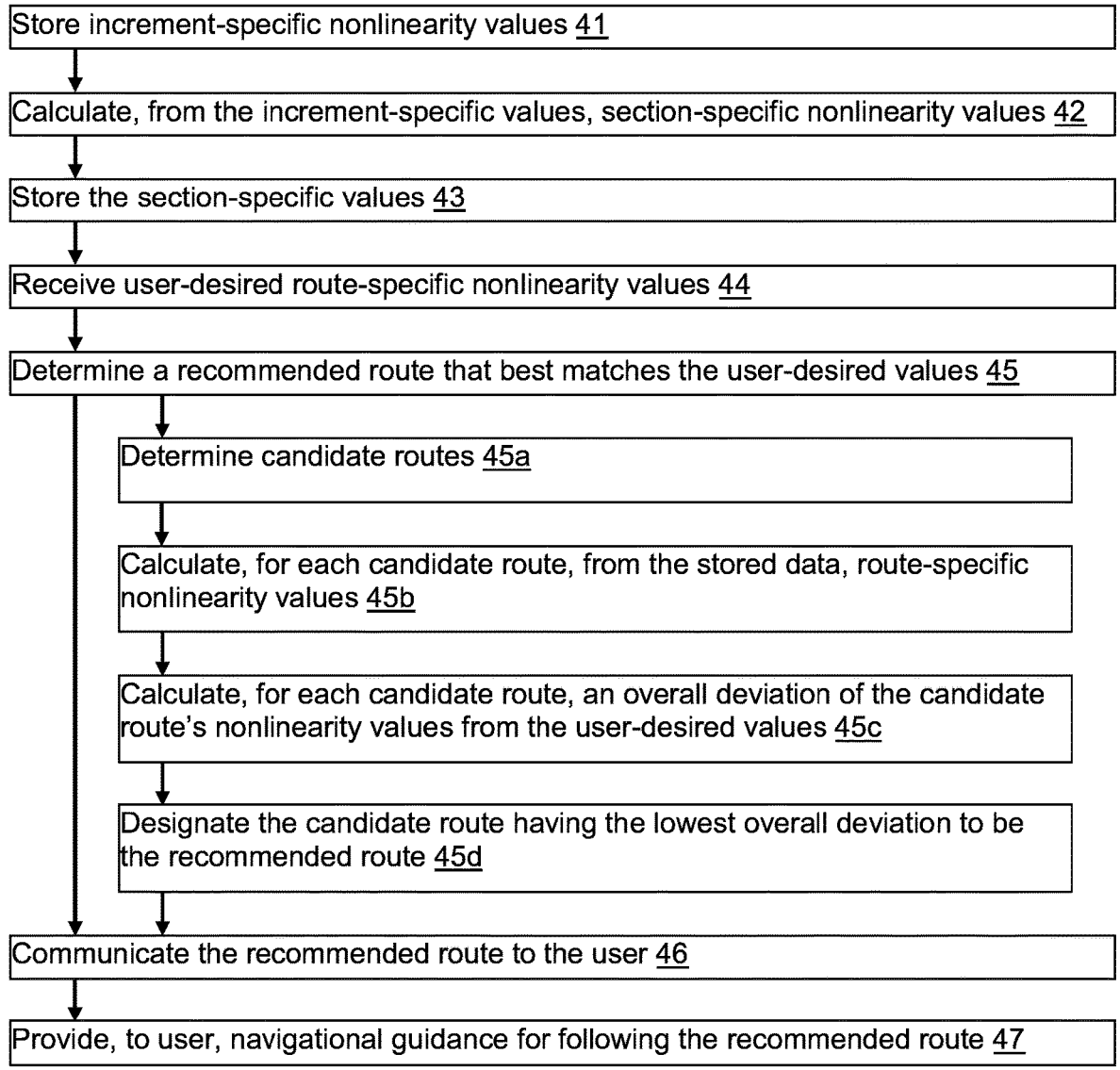
FIG. 8 is a flow chart of an example method implemented by the system of FIG. 1, in accordance with the present invention.

FIG. 8 is a flow chart of an example process (method) for determining a travel route. The process includes the following steps: Storing, for each of multiple road-increments in a region, increment-specific road-nonlinearity values relating to road-nonlinearity characteristics (step 41). Calculating, from the increment-specific road-nonlinearity values, for each of multiple road-segments in the region, segment-specific road-nonlinearity values relating to the road-nonlinearity characteristics (step 42). Storing the calculated segment-specific road-nonlinearity values (step 43). Receiving, from a user, one or more user-desired route-specific road-nonlinearity values relating to the road-nonlinearity characteristics (step 44). Determining a recommended route based on the route's closeness of fit with the user-desired route-specific road-nonlinearity values (step 45). Communicating the recommended route to the user (step 46). Providing the user with navigational guidance for following the recommended route (step 47).

Step 45 above might include the following sub-steps: Determining multiple candidate routes that extend from a user-desired starting point to a user-desired ending point (step 45*a*). Calculating, for each candidate route, from the stored segment-specific values, route-specific road-nonlinearity values (step 45*b*). Calculating, for each candidate route, an overall deviation of the respective candidate route's route-specific road-nonlinearity values from the corresponding user-desired route-specific road-nonlinearity values (step 45*c*). Designating the candidate route having the lowest overall deviation to be the recommended route (step 45*d*).

Alternative Scenarios

In the example above, the user-provided starting and ending points are different from each other. In an alternative scenario, the starting and ending points are the same, and the user specifies a route length (e.g., in units of miles as shown in FIG. 2). In such a scenario, the route is a closed-loop. Such a scenario might be typical for a user who wants to travel—for exercise by foot or bicycle—a particular number of miles under a particular set of road characteristics and end up at the same place that he/she started. In place of, or in addition to, a set route length, the user might include different road segments (sections) that the closed-loop route should include. This is exemplified by FIG. 6, in which the user has selected the starting and ending points to be the same and has selected desired road segments 31. As exemplified in FIG. 7, the recommended route 32 includes those user-selected road segments (31 in FIG. 6). Accordingly, the recommended route may be termed an "assembled route", in that it comprises a sequence of road segments, including the user-selected segments, that the system has assembled together (strung together) to arrive at the final recommended route.

Prior to selecting of the candidate route to be the recommended route, the system might display, to the user, (1) a roadmap in which a plurality of the multiple road segments are highlighted and (2) an indication that the highlighted road segments would provide relatively high travel-exhilaration if traveled. ("Relatively high" herein means higher than other segments in the area.) And then the system might receive, from the user, a user-selection of road segments, from among the highlighted road segments, that the user desires to travel. The system's selection of the candidate route to be the recommended route might then be based at partially on the candidate route including the user-selected highlighted road segments. For example, the system's selection of the candidate route to be the recommended route might be based both (1) on the candidate route including the user-selected highlighted road segments and (2) on the results of the comparison.

When the user is entering route-preferences, the server 2 might send a subset of road-characteristics (that are stored in the database 2*d*) to the mobile device 3. The mobile device 3 could use the received data to display a roadmap of the area containing the starting and ending points, and to color-code each road increment or segment in the map to indicate the value of the characteristic for that increment/segment. For example, if the color-coded characteristic is hilliness, the map could render road sections of high hilliness, medium hilliness, and low hilliness respectively with dark red, medium red, and light-red. The color-coding would enable the user to make a more-informed decision regarding which road sections to select for inclusion into the recommended route.

In the above example, the user-entered values are for fewer than all of the characteristics, as illustrated in FIG. 2 by some characteristics being left without a numeric entry. In one example, the user might choose to provide a desired value for only one characteristic—such as hilliness. In that scenario, the process would provide a recommended route whose hilliness value is closest to the user-entered value. If the user-selected hilliness value is, for example, zero, then the server 2 would select the route, from among the candidate routes, that has the lowest value for hilliness.

In the above example, the recommended route follows a sequence of sections (increments and/or segments) of road. In another example, the route is along sections of sidewalks. Each sidewalk section might comprise a segment that extends from one road-intersegment to the next. And the database data might include the aforementioned characteristics—including shadiness and bumpiness—for sidewalks too. This scenario would be particularly useful for a cyclist who prefers to cycle on sidewalks more than roads due to lower chance of being hit by a car when cycling on sidewalks, and would want the system to provide a sidewalk-based route that is least-bumpy and most-shady.

In yet other examples, the route might be along bike baths and/or along bike lanes and/or along walking paths in a forest.

In the above example, the route calculation is performed by a server 2 that is remote from the mobile device 3, and road-related data used in the route calculation is stored in the remote database 2*d*. In other examples, the route calculation is performed by the mobile device 3 itself (by the mobile device's processor 3*p*). In such scenarios, the mobile device's data storage medium 3*sm* might be prepopulated with the road-related data for each road segment or increment. Or the mobile device 3 might receive the road-related data for each segment/increment as-needed from the remote database 2*d*.

In the example shown in FIG. 2, levels of route characteristics are designated by numbers. In other examples, the desired levels might be designated by other means, such as by length of a bar graph, and might be user-adjusted by clicking-and-dragging an end of the bar graph.

The values of each route characteristic can be based on any full-scale range, extending from some lowest value to some highest value. The range might have any number of selectable values. For example, a range might have only three selectable values—of low, medium and high. Or a range might have a substantially-infinite number of selectable values.

The components and procedures described above provide examples of elements recited in the claims. They also provide examples of how a person of ordinary skill in the art can make and use the claimed invention. They are described here to provide enablement and best mode without imposing limitations that are not recited in the claims. In some instances, in the above description, a term is followed by a substantially equivalent term or an alternative term, enclosed in parentheses.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A processor-implemented method comprising:

storing, for each of multiple road sections, one or more section-specific road-nonlinearity values relating to one or more road-nonlinearity characteristics of the respective road section, wherein each road section is a road-segment that comprises multiple road-increments, and wherein the road-nonlinearity characteristics include slope gradient of the road segments;

receiving, from a user, one or more user-desired route-specific road-nonlinearity values relating to the one or more road-nonlinearity characteristics;

calculating, utilizing an artificial intelligence algorithm, from the stored section-specific road-nonlinearity values, for a candidate route, one or more route-specific road-nonlinearity values relating to the one or more road-nonlinearity characteristics;

performing an iterative data clustering analysis to compare the candidate route's route-specific road-nonlinearity values to the user-desired route-specific road-nonlinearity values;

based on results of the comparison, selecting the candidate route to be a recommended route; and communicating the recommended route to the user; and displaying, to the user, a roadmap rendered on a touchscreen display, wherein the roadmap comprises multiple road segments and, wherein program instructions stored in a processor-readable non-transitory hardware data-storage medium, when executed by a processor, cause at least one of the multiple road segments to be rendered on the touchscreen display as color-coded based on slope gradient and a direction of travel.

2. The method of claim 1, wherein the section-specific road-nonlinearity values are segment-specific road-nonlinearity values, and the method further comprises, before the storing of the segment-specific road-nonlinearity values, performing the following for each of the road-nonlinearity characteristics for each of the road-segments:

for each of the respective road-segment's road-increments, storing an increment-specific value relating to the respective road-nonlinearity characteristic; and calculating a segment-specific value for the respective road-nonlinearity characteristic for the respective road-segment based on a summation of the stored increment-specific road-nonlinearity values of the road-increments that comprise the respective road-segment.

3. The method of claim 2, wherein each road-increment has a length less than 20 feet, and each road-segment has a length of greater than 1/10 mile.

4. The method of claim 1, wherein said candidate route is one of multiple candidate routes, and the method further comprises:
calculating, for each of the candidate routes, from the stored section-specific road-nonlinearity values, route-specific road-nonlinearity values;
calculating, for each of the candidate routes, an overall deviation of the respective candidate route's route-specific road-nonlinearity values from the corresponding user-desired route-specific road-nonlinearity values; and
selecting one of the candidate routes to be the recommended route based on the selected route's overall deviation.

5. The method of claim 4, wherein the method further comprises, prior to said selecting of the candidate route:
displaying, to the user an indication that the highlighted road segments would provide relatively high travel-exhilaration if traveled; and
receiving, from the user, a user-selection of road segments, from among the highlighted road segments, that the user desires to travel;
wherein said selecting of the candidate route to be the recommended route is based both (1) on the results of the comparison and (2) on the candidate route including the user-selected highlighted road segments.

6. The method of claim 5, wherein each road-section is a road-increment having a length of less than 20 feet.

7. The method of claim 5, wherein each road-section is a road-segment extending from one intersegment of the road to the next intersegment.

8. The method of claim 1, further comprising, after communicating the recommended route to the user:
providing navigational guidance to the user for following the recommended route.

9. The method of claim 1, wherein the road-nonlinearity characteristics include horizontal curvature acuity, which relates to the angle of the angular orientation (A) of a steering wheel when driving along a road, relative to the steering wheel's base orientation for driving straight forward.

10. The method of claim 1, wherein the road-nonlinearity characteristics include twistiness, which is associated with horizontal waviness.

11. The method of claim 1, wherein the road-nonlinearity characteristics include hilliness, associated with vertical waviness of the route.

12. The method of claim 1, wherein the road-nonlinearity characteristics include road bumpiness.

13. The method of claim 1, wherein the road-nonlinearity characteristics include twistiness exhilaration, which is a positive function of both (1) a number of horizontal inflection points of a road section and (2) summation of increment-specific horizontal G-forces in the road section.

14. The method of claim 1, wherein the road-nonlinearity characteristics include hilliness exhilaration, which is positive function of both (1) a number of vertical inflection points of a road section and (2) summation of increment-specific vertical G-forces in the road section.

15. The method of claim 1, wherein the selecting of the candidate route to be a recommended route is further based on shadiness of the candidate route.

16. The method of claim 1, wherein:
the receiving is performed by a mobile communication device that accompanies the user while the user is travelling along the recommended route; and
the calculating, the comparing and the selecting are performed by a server that is in communication with the mobile communication device.

17. The method of claim 16, wherein the mobile communication device is part of a motor vehicle that the user drives along the recommended route.

18. The method of claim 1, wherein the selecting of the candidate route to be the recommended route includes maximizing the road-nonlinearity.

19. The method of claim 1, wherein the selecting of the candidate route to be the recommended route includes minimizing the road-nonlinearity.

* * * * *